Figure 1:
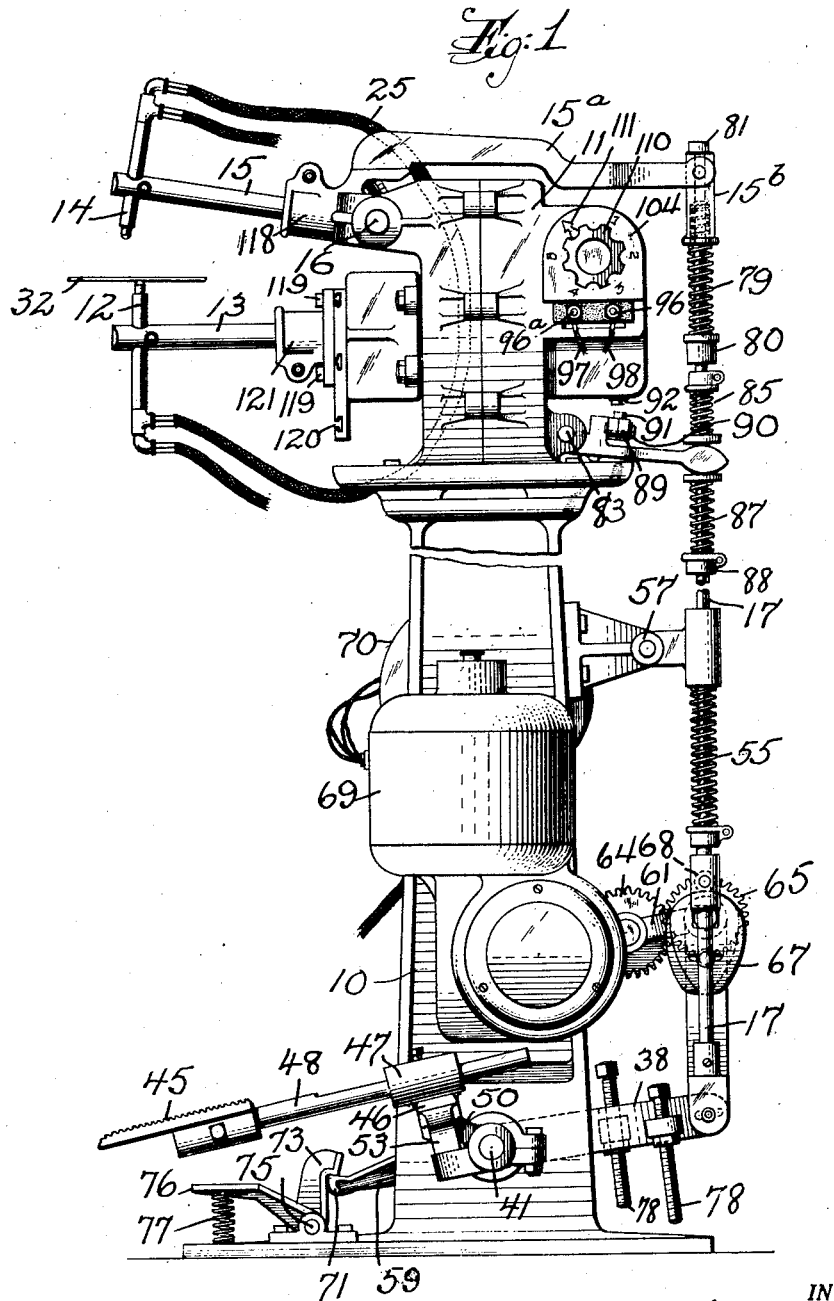

July 2, 1935.  C. EISLER  2,006,544
WELDING MACHINE
Filed April 7, 1932  6 Sheets-Sheet 1

INVENTOR.
Charles Eisler,
BY
Wm. H. Camfield.
ATTORNEYS.

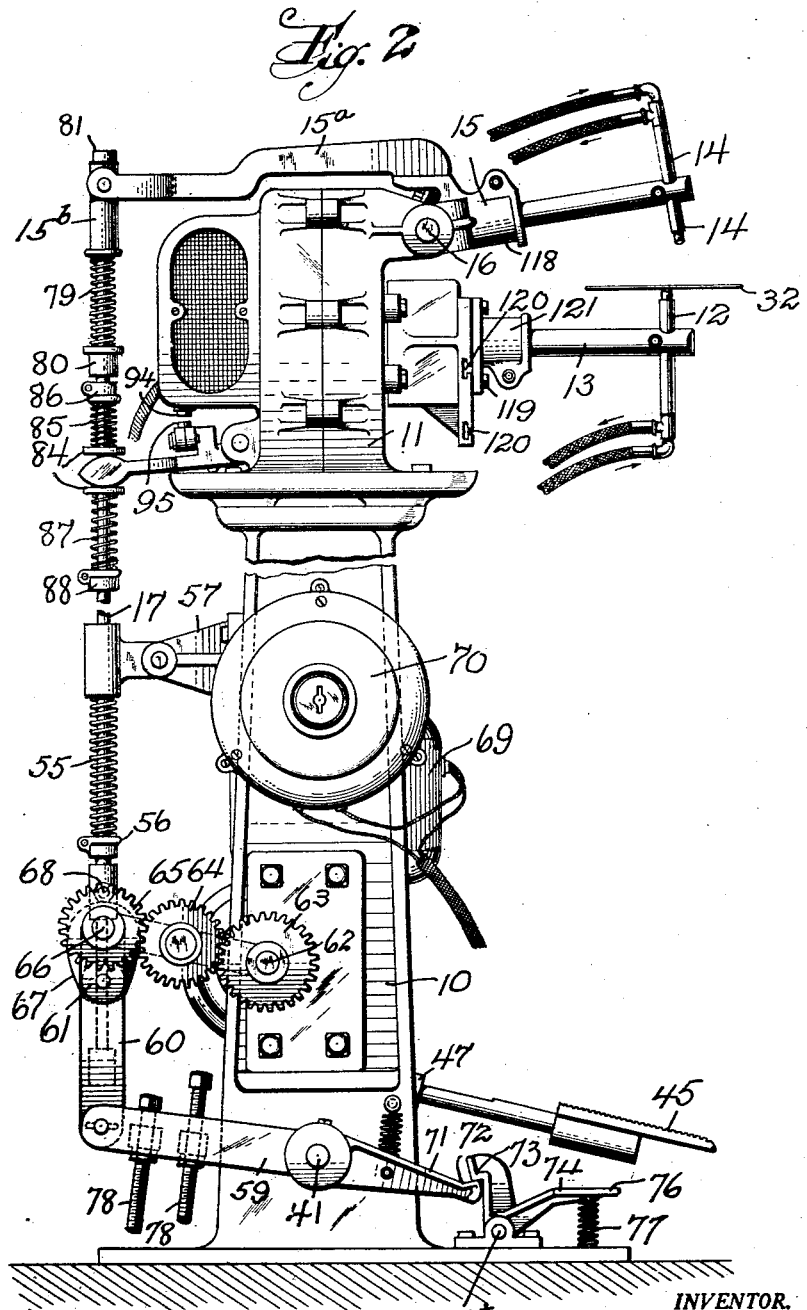

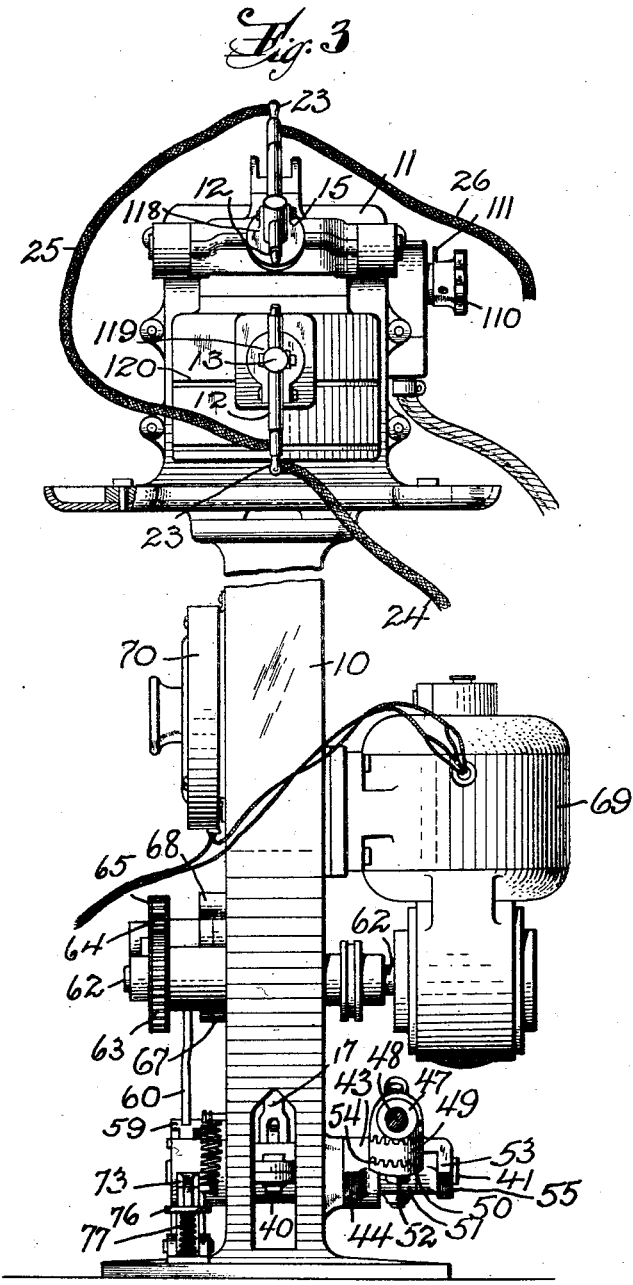

July 2, 1935. C. EISLER 2,006,544
WELDING MACHINE
Filed April 7, 1932 6 Sheets-Sheet 4
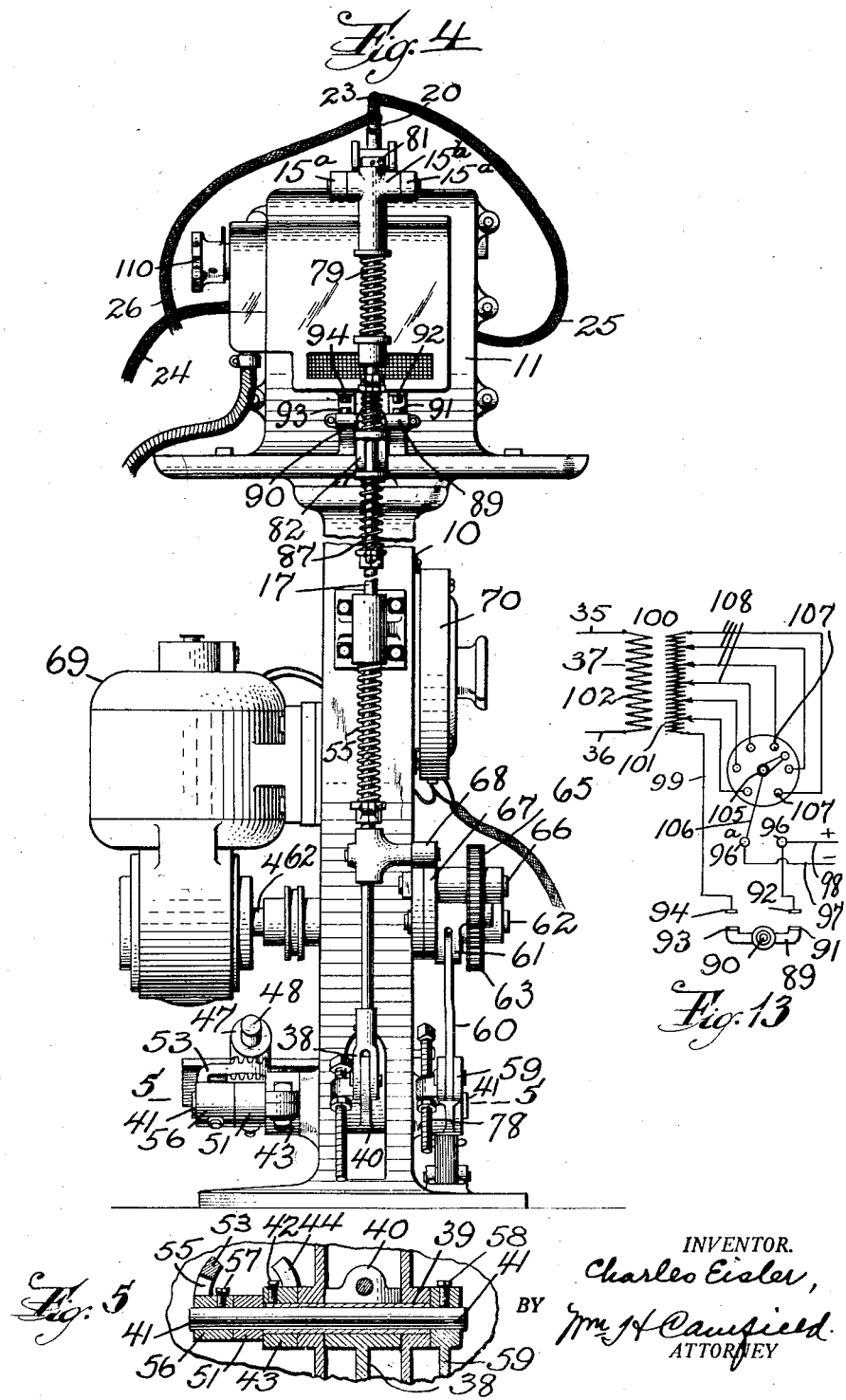

July 2, 1935. C. EISLER 2,006,544
WELDING MACHINE
Filed April 7, 1932 6 Sheets-Sheet 5
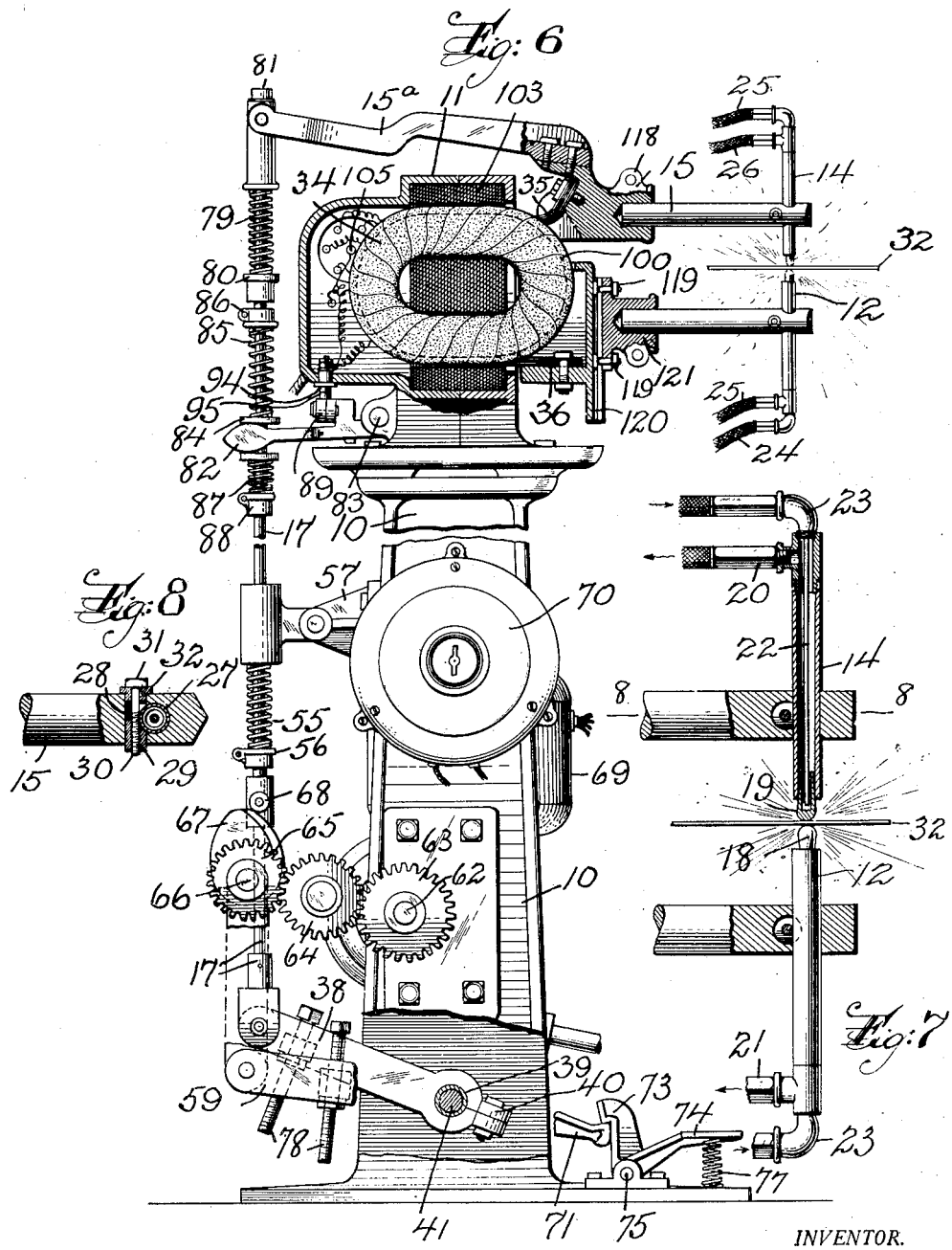
INVENTOR.
Charles Eisler,
BY
ATTORNEYS.

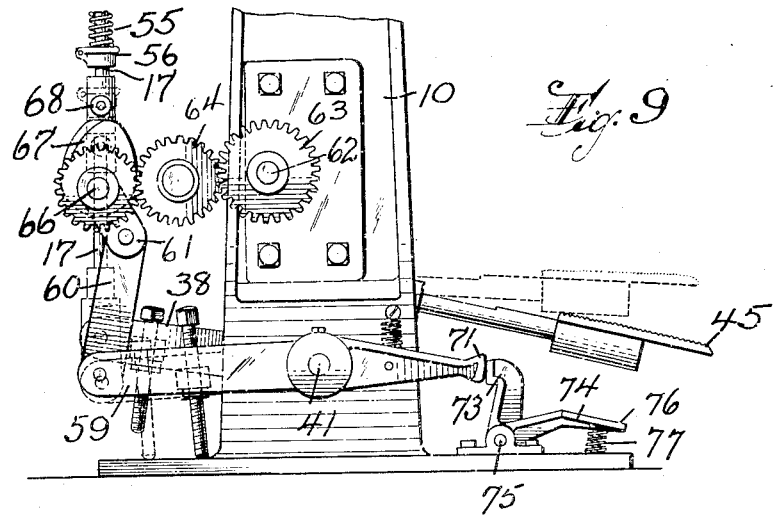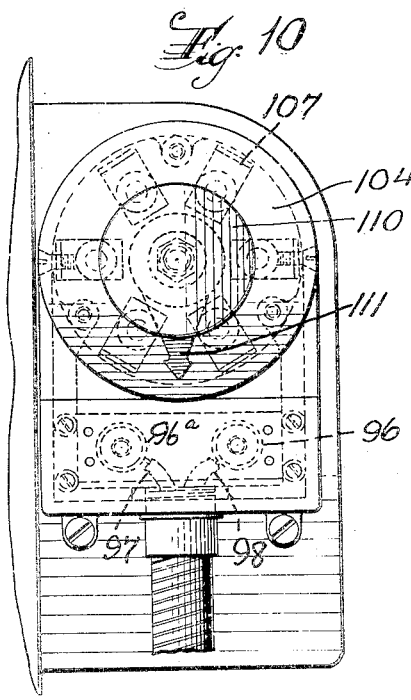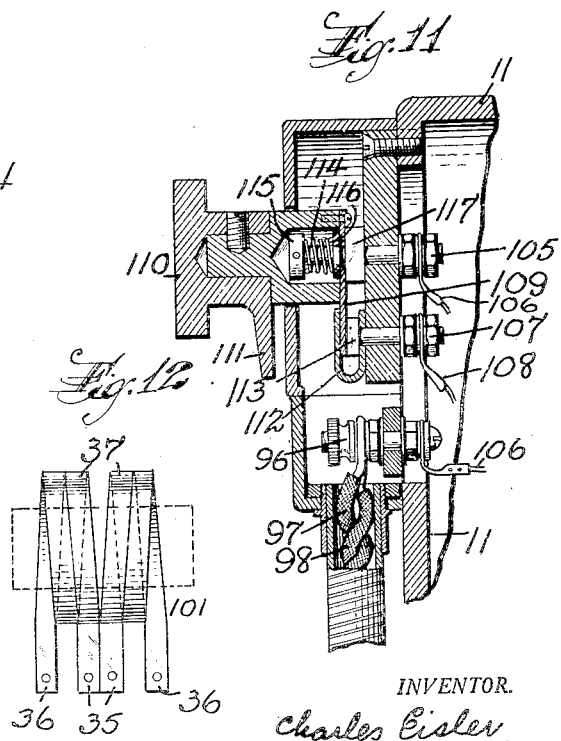

Patented July 2, 1935

2,006,544

UNITED STATES PATENT OFFICE 2,006,544

WELDING MACHINE

Charles Eisler, Newark, N. J., assignor to Eisler Engineering Company, Newark, N. J.

Application April 7, 1932, Serial No. 603,820

3 Claims. (Cl. 219—4)

This invention relates to an improved welding machine for applying welding to sheets of metal and the like. It is automatic in its operation following a manual operation of a foot pedal or its equivalent.

The object of the invention is to provide a welding machine which can be operated to give a single contact of the welding points to the work which ceases when the foot pedal is released and also adapted for adjustment whereby repeated contacts are given in succession while the foot pedal is operated.

Another object of the invention is to control the contacts and the electric circuit to the end that the contacts engage the work and then the circuit is made and when or before the mechanical contact is broken the electric circuit is broken. This insures safety from accident when the machine is not actually welding.

The invention also relates to certain details of construction which will be more fully described hereinafter and also embodied in the claims.

The invention is illustrated in the accompanying drawings in which Figure 1 is a view of the right side of a welding machine embodying my invention. Figure 2 is a view of the left side of the machine shown in Figure 1. Figure 3 is a front view of the machine. Figure 4 is a rear view of the machine. Figure 5 is a detail section on line 5—5 in Figure 4. Figure 6 is a side view of the machine broken away at the bottom and shown in section at the top. Figure 7 is a detail view of the contacts partly in section. Figure 8 is a section on line 8—8 in Figure 7. Figure 9 is a side view of the bottom part of the machine with the trip of the repeating mechanism released.

Figure 10 is an enlarged detail side view of the control switch of the transformer. Figure 11 is a vertical central section of Figure 10. Figure 12 is a diagrammatic elevation of the winding of the secondary coil of the transformer. Figure 13 is a diagram of the wiring of the transformer, switch and make-and-break device.

The machine comprises a suitable double standard 10 having a housing 11 at the top. The housing supports a contact point 12 on an arm 13. This arm is fixed. A second contact point 14 is secured by a clamp joint 118 to the lever 15 pivoted at 16 to the top of the housing and extending to the rear as an arm 15ª which includes a yoke-like link 15ᵇ which is operated in turn by the rod 17 by means of which it is moved to operative and inoperative positions.

The fixed contact point 12 is adjustable as its base part can be secured in various positions by bolts 119 (Figure 6) which have their heads in the undercut slots 120 in the face of the housing 11. The slots are preferably arranged as a central vertical slot and two parallel horizontal slots. When moved horizontally away from the centre line of the machine, the lower fixed contact point 12 can be aligned with the point 14 by loosening the clamp joint 118 and the clamp joint 121 and then securing said clamp joints when the points have been aligned. These adjustments are sometimes necessary in welding pieces that are recessed or otherwise formed in a way to compel such adjustment. The contact points are shown in detail in Figures 7 and 8. The contact points comprise the tip 18 on the tube 12 and the tip 19 on the tube 14. The tubes are hollow and have connections 20 and 21 respectively for attaching hose. The tubes have interior pipes 22 in each one. These tubes extend nearly to the terminals and are spaced from the inside walls of the tubes 12 and 14 to form water passages. On the outer end of each pipe 22 is a connection 23. A hose 24 (Figure 3) feeds cool water to one pipe 22, in this case the lower one, and a hose 25 conducts the water from the tube 12 to the pipe 22 in the upper tube 14. Another hose 26 conducts the water from the connection 20 to a cooling device to which the hose 24 is also connected. This provides a circulation of cooling water to the contact points. The tubes 12 and 14 are secured to their respective arms by resting in a hole 27 in the arm (Figure 8) and a hole 28 is tangential to the hole 27. A movable wedge-like block 29 has a rounded part that rests against the tube and a screw 30 is used to tighten the wedge and consequently the tube. The head 31 of the screw rests against the bushing 32 and is on the outside of the assembly or the head 31 can be made large enough to dispense with the bushing 32. This arrangement provides a positive grip on the tubes 12 and 14 and also allows an easy and ready adjustment of the space between the points to provide proper contact on work of various thicknesses. A plate 32 represents the work in the drawings.

The transformer that supplies current to the arms 13 and 15 is shown at 34 and the secondary coil is connected at 35 to the arm 15 and at 36 to the arm 13. To provide a transformer with higher reactance I make two turns as shown in Figure 12. The secondary coil 37 is formed into two lighter turns instead of one heavy turn. The improved construction greatly reduces splashing at the point of weld. This construction which splits the secondary to distribute the turns evenly over the primary winding enables a much better coupling between the primary and secondary. The electric circuit will be described in detail hereinafter.

To move the contact arm 14 and its lever 15 the rod 17 is moved vertically. The rod 17 is connected at the bottom to the rear end of an arm 38 secured to rock with a sleeve 39 to which it is clamped as by the split collar 40. The sleeve 39 is rotatable freely on the shaft 41. The sleeve 39 is fastened as by the screw 42 to the collar 43 with a projection 44 on it (see Figures 3 and 5). The foot treadle 45 rocks the boss 46 when it is operated. This boss 46 comprises three parts a sleeve 47 in which the rod 48 of the treadle is adjustable, a centre ring 49 and a bottom member 50 which includes a collar 51 fitting loosely on the shaft 41. These three members that comprise the boss are held together by a central bolt 52. The central ring 49 has a finger 53 that can be swung to the left to rest on the projection 44 or swing to the right to rest on a similar projection to be described hereinafter.

The drawings show it in this latter position. To turn the ring 49 and its finger 53 the bolt 52 is unscrewed and the ring partly rotated and then the parts are again clamped. Roughened or toothed construction as at 54 can be used to hold the parts against shifting. It will be evident that when the finger 53 is over the projection 44 and the treadle is pushed down, the collar 43 is rocked and it rocks the sleeve 39 and the arm 38 and this in turn raises the rod 17 and the lever 15ª and its arm 15 are swung to lower the contact point 14. When the treadle is released the parts return to normal position through operation of the spring 55 abutting on the collar 56 on the rod 17 and on the arm 57 projecting from the back of the standard 10.

This adjustment of the ring 49 and its finger 53 provides for a single contact for each operation of the foot treadle.

The mechanism for operating the contact 12 repeatedly as long as the foot treadle remains down is operated when the finger 53 is situated as in Figure 3 resting on the projection 55 on the collar 56. The collar 56 is secured as by a screw 57 to the shaft 41 which is secured at the other end as by the screw 58 to the arm 59. The arm 59 is provided at its outer end with a link 60 to which it is pivoted. This link is pivoted at its upper end to one end of a right angled arm 61 which is in turn pivoted as at 62 to the standard 10. This arm 61 carries the driving gear 63, the intermediate gear 64 and the driven gear 65 secured on the shaft 66 to which is also fastened the cam 67. The rod 17 has a roller 68, or its equivalent to rest on the cam and as the cam rotates the rod 17 is moved up and down and contacts are repeatedly brought together while removing the foot from the treadle 45.

The gear 63 is driven by shaft 62 on which it is fastened. The shaft 62 is driven from the motor 69 mounted on the side of the standard 10. The motor is controlled by the rheostat 70. This motor and its control is of any conventional kind.

The arm 59 is provided with a front extension 71 and normally has its front end 72 caught under the nose 73 of the trip 74 pivoted at 75 and including a foot piece 76 which is held up by a spring 77. This arrangement holds the gearing and the cams up by means of the arm 59 without the necessity of holding down the treadle 45. To start the repeated welding during which the work is shifted, the foot treadle is pushed down. This catches the end of the extension 71 under the trip 74. When the work is completed the foot-piece 76 is pushed down, the lever 59 is released, the cam is lowered, as in Figure 9, and the gears and cam work idly, the cam out of contact with the roller 68. The arm 59 and the arm 38 are shown equipped with screws 78 to fix their normal positions.

In order to prevent excess pressure by the contact point 14 the rod 17 is not connected directly to the lever 15ª but the pressure is transmitted through the spring 79 which abuts on the adjustable collar 80 on the rod 17 and also abuts on the bottom side of the lever 15ª or its yoke 15ᵇ. The rod slides freely in the end of the yoke 15ᵇ and has an enlargement 81 which engages the lever yoke 15ᵇ when the rod 17 descends.

The wiring and control of the transformer will be evident from an inspection of the diagram in Figure 13, the detail drawings of the switch in Figures 10 and 11 and the illustration of its cooperation with a make-and-break device shown in the front and side view of the machine.

The make-and-break device, as shown, consists of lever 82 with a forked end embracing the rod 17 and pivoted at 83 to the housing 11. It is moved by flanges 84 above and below the forked end. A spring 85 is above the lever and abuts on a collar 86. A spring 87 is below the lever 82 and abuts on a collar 88 secured on the rod 17. The spring 87 is considerably weaker than the spring 85.

The lever 82 carries a yoke 89 that rocks at its centre at 90 on the lever 82. At each end of the yoke 89 is a contact, one 91 is opposite a fixed contact 92 on the housing. The other 93 is opposite a fixed contact 94 on the housing. When the lever 82 is raised it completes the circuit between the contacts 92 and 94 as the yoke is made of conducting material suitably insulated from the lever 82. The contact 92 is connected by wire to one of a pair of binding posts 96 and 96ª which receive the main line wires 97 and 98. The contact 94 is connected by the wire 99 to the primary coil 100 of the transformer 101 which also includes the secondary coil 37 and the core 103. The switch 104 has the central post 105 connected by wire 106 to the post 96ª. The central post 105 makes contact with separated contacts 107 each connected by a wire 108 at spaced points in the primary coil to control the voltage of the secondary coil by varying the ratio of transformation. In Figures 10 and 11 I show a form of switch in which the switch arm 109 secured on the post 105 is secured to the rotatable knob 110 which has a pointer 111 to indicate with which of the contacts 107 the arm 109 is connected. The contacts 107 have each a looped metal piece 112 and a head 113, between which the arm 109 slides to insure proper contact.

The central part of the knob has a chamber in which the spring 114 is seated. It presses against a fixed abutment 115 and also presses against the flange 116 of the arm 109 to keep the contacts with the block or head 117 of the central post 105 and the terminals 113 of the contacts 107 tight.

In the operation of the machine the work 32 is placed on the fixed contact point 12. The finger 53 is adjusted either over the projection 44 for single stroke operation or over the finger 55 for intermittent stroking operation from the foot treadle. As the foot treadle is depressed the rod 17 is pushed upwardly. The spring 79 is compressed and the lever 15ᵃ, the arm 15 and the contact point 14 are moved to operative position. After the contacts 12 and 14 are in welding position the spring 87 which has been under increased compression finally overcomes the spring 85 and the lever 82 is moved upwardly to cause the make-and-break device to complete the circuit through the yoke 89 and thus through the transformer to energize the contacts 12 and 14.

When the treadle is released the rod 17 descends, the heavier spring 85 overcomes the spring 87, the make-and-break device is opened to open the circuit and the current is shut off from the contact points 12 and 14 before these contact points are separated.

It will be evident that various changes can be made in the arrangement and form of the parts without departing from the scope of the invention.

The machine is very effective in operation, the welding is done without splashing, the regulation of the circuit is readily accomplished and the machine takes up but little room on the floor of an establishment.

I claim:—

1. In a welding machine, a standard, a movable welding point, a rod by which the point is actuated, a sleeve mounted so as to oscillate in the standard, an arm secured at one end to the sleeve and pivotally connected at its other end to the rod, a collar on the sleeve and having a projection thereon, a shaft arranged to oscillate in the sleeve, and having a collar secured thereto with a projection opposite the first mentioned projection, an arm secured to the shaft, a link secured to the end of the arm, a right-angled arm pivoted to the standard and to the end of the link, a shaft at the turn of the right angled-arm, a cam on the last-mentioned shaft, a driven gear on the same shaft, a roller on the rod with which the cam is adapted to engage, a train of gears including a driving gear on the right angled arm to operate the cam, a treadle loosely rotatable on the shaft supporting the sleeve and having a finger, and means for adjusting the finger to selectively engage the projections of the shaft and the sleeve.

2. In a welding machine, a standard, a movable welding point, a rod by which the point is actuated, a sleeve mounted so as to oscillate in the standard, an arm secured at one end to the sleeve and pivotally connected at its other end to the rod, a collar on the sleeve and having a projection thereon, a shaft arranged to oscillate in the sleeve, and having a collar secured thereto with a projection opposite the first-mentioned projection, an arm secured to the shaft, a link secured to the end of the arm, a right-angled arm pivoted to the standard and to the end of the link, a shaft at the turn of the right-angled arm, a cam on the last-mentioned shaft, a driven gear on the same shaft, a roller on the rod with which the cam is adapted to engage, a train of gears including a driving gear on the right-angled arm to operate the cam, a treadle including a bottom member loosely mounted on the shaft in the sleeve, a sleeve, a center ring having a finger to engage either of the projections, and a bolt central to the ring for adjustably securing the ring in place, whereby the treadle can be engaged by one operating means and disengaged from the other.

3. In a welding machine, a standard, a movable welding point, a rod by which the point is actuated, a sleeve mounted so as to oscillate in the standard, an arm secured at one end to the sleeve and pivotally connected at its other end to the rod, a collar on the sleeve and having a projection thereon, a shaft arranged to oscillate in the sleeve, and having a collar secured thereto with a projection opposite the first mentioned projection, an arm secured to the shaft, a link secured to the end of the arm, a right-angled arm pivoted to the standard and to the end of the link, a shaft at the turn of the right-angled arm, a cam on the last-mentioned shaft, a driven gear on the same shaft, a roller on the rod with which the cam is adapted to engage, a train of gears including a driving gear on the right-angled arm to operate the cam, a treadle including a bottom member loosely mounted on the shaft in the sleeve, a sleeve, a rod secured in the sleeve and having a foot portion, a center ring having a finger to engage either of the projections, and a bolt central to the ring for adjustably securing the ring in place, whereby the treadle can be engaged by one operating means and disengaged from the other, an extension on the arm, and a trip for engaging the extension to hold the arm and its associated parts in operative position.

CHAS. EISLER.